(12) United States Patent
Lehmann et al.

(10) Patent No.: US 8,103,595 B2
(45) Date of Patent: Jan. 24, 2012

(54) LICENSING SYSTEM AND PROCESS FOR TRANSFERRING LICENSE INFORMATION

(75) Inventors: Martin Lehmann, Lübeck (DE); Klaus Marquardt, Lübeck (DE)

(73) Assignee: Dräger Medical GmbH, Lübeck (DE)

( * ) Notice: Subject to any disclaimer, the term of this patent is extended or adjusted under 35 U.S.C. 154(b) by 799 days.

(21) Appl. No.: 11/943,056

(22) Filed: Nov. 20, 2007

(65) Prior Publication Data

US 2008/0133418 A1    Jun. 5, 2008

(30) Foreign Application Priority Data

Dec. 5, 2006 (DE) .......................... 10 2006 057 197

(51) Int. Cl.
*G06F 21/00* (2006.01)

(52) U.S. Cl. ................ 705/59; 705/50; 705/51; 705/52; 705/55; 705/57; 726/5; 726/26; 380/227; 380/228; 380/229; 380/230

(58) Field of Classification Search ...................... 705/59
See application file for complete search history.

(56) References Cited

U.S. PATENT DOCUMENTS

| | | | |
|---|---|---|---|
| 5,568,552 A | 10/1996 | Davis | |
| 2002/0087870 A1 | 7/2002 | Rick | |
| 2002/0147922 A1 | 10/2002 | Hartinger et al. | |
| 2003/0004897 A1* | 1/2003 | Smith, IV | 705/76 |
| 2006/0059105 A1* | 3/2006 | Ebihara et al. | 705/59 |
| 2006/0074718 A1* | 4/2006 | Fucci et al. | 705/3 |

FOREIGN PATENT DOCUMENTS

| | | |
|---|---|---|
| DE | 100 01 126 | 7/2001 |
| DE | 199 63 471 A1 * | 7/2001 |
| DE | WO 01/52017 | 7/2001 |
| EP | 1 164 456 | 12/2001 |

OTHER PUBLICATIONS

Australian Copyright Council Computer Software and Copyright (Jul. 2005). Retrieved online from Google Sep. 13, 2011.*

* cited by examiner

*Primary Examiner* — James A Reagan
(74) *Attorney, Agent, or Firm* — McGlew and Tuttle, P.C.

(57) ABSTRACT

A licensing system is provided for transferring license information for at least one license-requiring software component of software-controlled devices. The licensing system comprises a first, portable license data storage medium (3), which is provided with a processor unit (8) and on which at least one license information for the at least one license-requiring software component is stored in a memory unit (9). A second, exchangeable license data storage medium (4; 4.1, 4.2) is provided with a processor unit (10; 10.1, 10.2). A data transfer channel (5) is provided for transferring data between the first license data storage medium (3) and the second license data storage medium (4; 4.1, 4.2). A license detection device (6) is provided which can poll the at least one license information of the first license data storage medium (3) and transfer same to the second license data storage medium (4; 4.1, 4.2) via the data transfer channel (5). The at least one license information can be stored in a memory unit (11; 11.1, 11.2) of the second license data storage medium (4; 4.1, 4.2) and cannot subsequently be polled any longer on the first license data storage medium (3). A license-providing device (7; 7.1, 7.2) is provided which can make available or transfer the at least one license information stored in the memory unit (11; 11.1, 11.2) to the software-controlled device (2) for releasing or blocking the at least one license-requiring software component.

20 Claims, 2 Drawing Sheets

LICENSING SYSTEM AND PROCESS FOR TRANSFERRING LICENSE INFORMATION

CROSS REFERENCE TO RELATED APPLICATIONS

This application claims the benefit of priority under 35 U.S.C. §119 of German Patent Application DE 10 2006 057 197.5 filed Dec. 5, 2006, the entire contents of which are incorporated herein by reference.

FIELD OF THE INVENTION

The present invention pertains to a licensing system and to a process for transferring license information for at least one license-requiring software component from software-controlled devices.

BACKGROUND OF THE INVENTION

Manufacturers of software-controlled devices protect their software program parts and/or software programs, hereinafter called software components, by coupling with license information, which is generally polled at the start of the software component and makes it possible to block or release the software component. Software-controlled devices are often equipped with software components for basic functions and with software components for additional functions. The additional functions are, however, made available to the user only with the acquisition of corresponding licenses. This may take place simultaneously with the delivery of the software-controlled devices or at a later point in time.

To make available more device functions, license information is transferred to the user, which can release one or more software components, which make available the additional functions of the software-controlled devices. Protection against undesired multiple use of the software components license is of essential significance for the manufacturer of the software-controlled devices in providing the license information.

There are various possibilities for protection against multiple use. One possibility is to make the license information available to the user in the form of a hardware assembly unit that cannot be duplicated. The hardware assembly unit acts for the user as an access key to release the license-requiring software components on the software-controlled device, to which the hardware assembly unit is connected. However, it is disadvantageous in this case that the hardware assembly unit can always be connected at the same time to one and the same software-controlled device only. Expansion of the functionality of the software-controlled device in the form of a release of additional license-requiring software components can be carried out only by replacing the hardware assembly unit. Moreover, there is another drawback in the use of such a device in that a plurality of hardware assembly units are also needed in case of a plurality of licensors. A hardware assembly unit, which can be handled more flexibly and which is designed in the form of a chip card, is described in DE 100 01 126 A1. License information, which can be transferred to the license-requiring software components, is stored on the chip card. Neither a hardware assembly unit coupled with the software-controlled device nor a correspondingly designed chip card is mechanically permanently coupled with the software-controlled device, so that it is not guaranteed that the hardware assembly group will permanently remain at the software-controlled device. However, guaranteeing the functions of software-controlled devices is of great significance especially in the area of emergency medicine. In addition, an additional hardware assembly unit or another hardware assembly unit must be made available to the software-controlled device any time the functionality of the software-controlled device is expanded in the form of the release of corresponding software components.

Another possibility of providing license information is to link the license information to an unambiguous device identification, which cannot be changed. The protective mechanism of the license-requiring software components is coupled with the existing hardware component of the software-controlled device. A serial number of the hardware component can be permanently assigned to the license-requiring software components or entered in same already when the license information is shipped. However, the license-requiring software components cannot be run on another hardware with the same license information, this possibility would be necessary especially for providing the license information from another software-controlled device on the basis of a failure due to repair.

It is, furthermore, possible to determine all the license information available for the license-requiring software components of the software-controlled device in the form of a mandatory central registration at a central site. Before running one or more license-requiring software components, a corresponding polling would then take place at the central site and multiple use of the license-requiring software component would be registered. However, the registration of the correspondingly licensed software components at a central site has proved to be disadvantageous insofar as a connection must be established between the software-controlled device and the registration site before each use. However, especially software-controlled devices in the area of emergency medicine, for example, respirators, are used predominantly as mobile units, so that connection of the particular respirator to the registration site is difficult for checking the licenses.

It is known from EP 1 164 456 A1 that license information can be made available to a software-controlled device in the form of a computer-readable data storage medium. An identification number, which is sent to the software-controlled device, is generated for this purpose for the unambiguous assignment of the hardware recognition and license information from a hardware recognition of the computer-readable data storage medium, which recognition cannot be altered any longer, and from additional license information by means of a coding algorithm. An unambiguous hardware recognition, which can be entered on this data storage medium only by the manufacturer in the manufacturing process in which the computer-readable data storage medium is manufactured, is written in an area of the data storage medium, which is later only readable but no longer writable. The hardware recognition is assigned only once and is thus unambiguous. Expansion of software licenses with the goal of making available additional functional components of the software-controlled device by releasing software components that require a license is thus made difficult. Replacement of the computer-readable data storage medium would be necessary for the distribution of additional license information.

SUMMARY OF THE INVENTION

The basic object of the present invention is to provide a licensing system for releasing license-requiring software components of software-controlled devices, which system is not bound to the corresponding software-controlled devices and rules out multiple use of the licensed software components. Moreover, the license information shall be able to be transferred to other software-controlled devices in case of a defect of the software-controlled device in a simple manner.

The essential content of the present invention is that license information is made available from a portable first licensed data storage medium via a secured license distribution channel to a second or more exchangeable license data storage media for releasing and/or blocking license-requiring software components of a software-controlled device.

The advantages that can be gained with the present invention are especially that license information is made available to the software-controlled device in a secured manner by the process steps according to the present invention:

a) authentication of the first license data storage medium against the second license data storage medium and vice versa;
b) establishment of a coded connection between the first license data storage medium and the second license data storage medium;
c) transfer of at least one license information from the first license data storage medium to the second license data storage medium;
d) not making available the at least one license information on the first license data storage medium; and
e) addition of the at least one license information on the second license data storage medium, wherein the license information is independent from the software-controlled device. Additional license information can thus be made available to the software-controlled device in a simple and secure manner. In case of loss of function of the software-controlled device, the license information can be transferred to a new device of the same type undamaged and in a simple manner.

The process according to the present invention can be carried out preferably on a licensing system for transferring license information for at least one license-requiring software component of software-controlled devices.

The licensing system comprises:

a first, portable license data storage medium, which is designed as a processor unit and on which at least one license information for the at least one license-requiring software component is stored in a memory unit;
a second, exchangeable license data storage medium equipped with a processor unit,
a data transfer channel for transferring data between the first license data storage medium and the second license data storage medium;
a license detection device, which can poll the at least one license information of the first license data storage medium and transfer same to the second license data storage medium via the data transfer channel, wherein the at least one license information can be stored in a memory unit of the second license data storage medium and cannot subsequently be polled any longer on the first license data storage medium; and
a license-providing device, which can make available or transfer the at least one license information stored in the memory unit to the software-controlled device for releasing or blocking the at least one license-requiring software component.

Exemplary embodiments of the present invention are described in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENT

Figure 1:
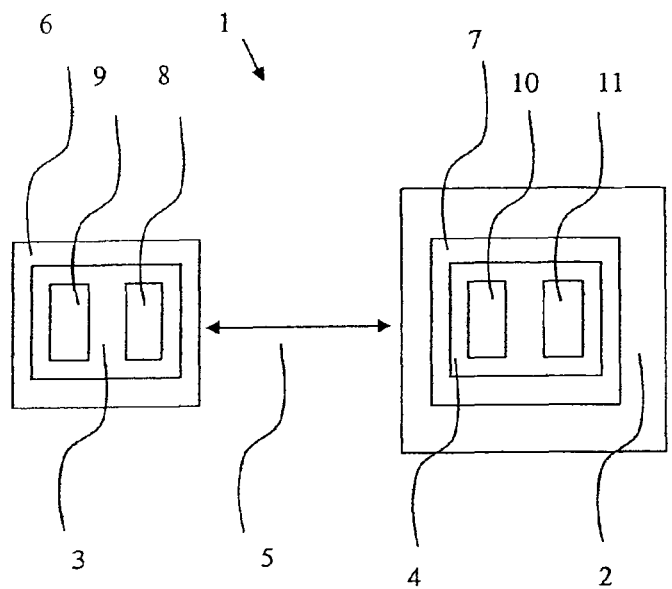
FIG. 1 is a schematic view of a first embodiment of the licensing system according to the present invention for a software-controlled device.
Figure 2:
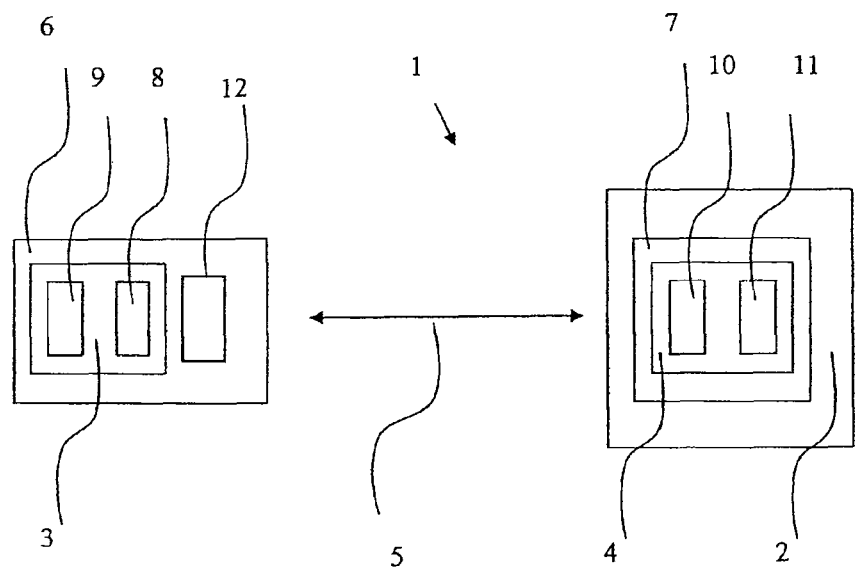
FIG. 2 is a schematic view of a second embodiment of the licensing system according to the present invention for a software-controlled device.

Referring to the drawings in particular, FIG. 1 schematically shows a preferred embodiment of the licensing system 1 according to the present invention for a software-controlled device 2, for example, an anesthesia apparatus or a respirator. A first license data storage medium 3 provided with a processor unit 8 contains on a memory unit 9 at least one license information for one or more license-requiring software components of the software-controlled device 2. The first license data storage medium 3 is designed as a portable license data storage medium, preferably as a SIM card, hereinafter called a T-SIM for short. The at least one license information can thus be transferred from a manufacturer of the one or more license-requiring software components of a software-controlled device 2 to a user of the software-controlled device 2 in a simple manner. This may be done, for example, by sending the T-SIM 3 by mail. The T-SIM 3 may contain additional license information, for example, a specification of a device model, to which the corresponding license shall be made available. In case of distribution of licenses for more than one software-controlled device 2.1, 2.2, for example, for a device system, shown in FIG. 3, it is also possible to store information on an assignment of the licenses to the corresponding devices 2.1, 2.2 of the device system on the T-SIM 3. The T-SIM 3 is connected to a second license data storage medium 4 provided with a processor unit 10 via a data transfer channel 5. The second license data storage medium 4 is exchangeable and is likewise designed preferably as a SIM card, hereinafter called i-SIM for short. The i-SIM 4 is located in the software-controlled device 2 and can be replaced in a simple manner. In case of a malfunction of the software-controlled device 2, the license information of the defective software-controlled device 2 can be made available to a device 2 of the same design, which is designed as a replacement device, within a short time. A license detection device 6, which is preferably arranged outside the software-controlled device 2, is equipped with means that are used to poll the at least one license information from the memory unit 9 of T-SIM 3, to transfer it to the i-SIM 4 via the data transfer channel and to store it on a memory unit 11 of the i-SIM 4. The at least one license information is subsequently blocked or deleted on the memory unit 9 of T-SIM 3. Before the transfer of the at least one license information from T-SIM 3 to i-SIM 4 takes place, a mutual authentication is performed in order to prevent unauthorized copying of the license information and hence multiple use. The processor unit 8 of T-SIM 3 now checks the identity of the i-SIM 4. The i-SIM 4 authenticates itself, i.e., it has its own identity in order to subsequently authenticate the T-SIM 3. An identity check is performed in the reverse direction, i.e., the processor unit 10 of i-SIM 4 checks the identity of T-SIM 3. The authentication of T-SIM 3 against i-SIM 4 and vice versa takes place directly by the processor unit 8 of T-SIM 3 and the processor unit 10 of i-SIM 4. FIG. 2 shows a schematic view of a second embodiment of the licensing system 1 according to the present invention for a software-controlled device 2, in which the authentication of T-SIM 3 against i-SIM 4 and vice versa takes place indirectly. The license detection device 6 is provided in this embodiment with a processor unit 12, which is arranged between the processor unit 8 of the T-SIM 3 and the processor unit 10 of the i-SIM 4. The authentication of T-SIM 3 against i-SIM 4 and vice versa is performed by the processor unit 12 of the license detection device 6 with the particular processor units 8 of T-SIM 3 and 10 of i-SIM 4. The license information is transferred from T-SIM 3 to i-SIM 4 only after the authentication has taken place successfully in both directions.

The data transfer channel 5 is considered to be secure after a successful authentication operation. The data are transferred from T-SIM 3 to i-SIM 4 preferably in a coded form with a 128-bit SSL coding. The transfer of the license information may take place in a conventional manner via direct contacts between the T-SIM 3 and the i-SIM 4. In another embodiment, not shown, the data transfer channel 5 may be of a contactless design, i.e., the data transfer may take place via radio. A license-providing device 7, which is arranged in the software-controlled device 2, is provided for providing or transferring the at least one license information stored on the memory unit 9 of i-SIM 3 for releasing and/or blocking the license-requiring software components of the software-controlled device 2. While the at least one license information of T-SIM 3 can only be read and is blocked or deleted on T-SIM 3 after transfer to i-SIM 4, the at least one license information can be stored on the memory unit 11 of T-SIM 4 and read by one or more license-requiring software components of the software-controlled device 2. The license information stored on i-SIM 4 may also consist of signaling a signal, which confirms a license code sent by the license-requiring software components.

Figure 3:
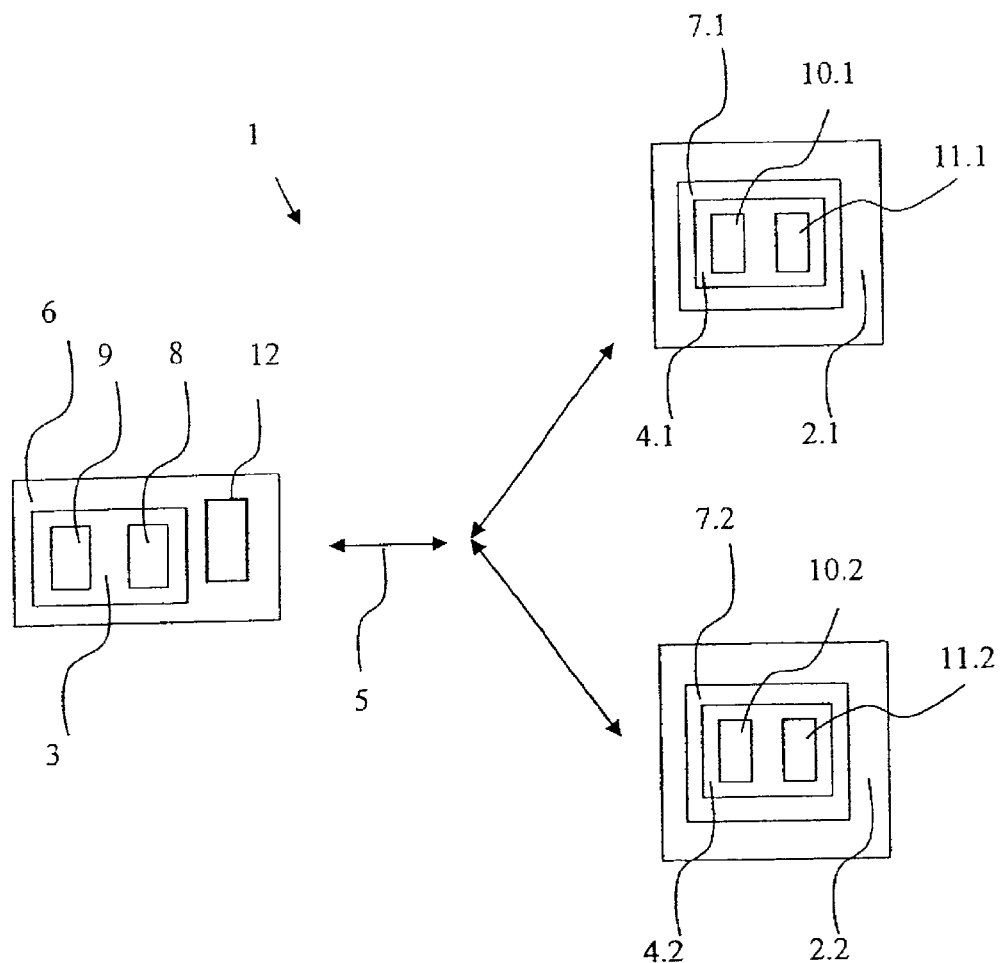
FIG. 3 is a schematic view of the second embodiment of the licensing system according to the present invention for two software-controlled devices.

A schematic view of the second embodiment of the licensing system 1 according to the present invention for transferring license information for license-requiring software components of software-controlled devices 2 for two software-controlled devices 2.1 and 2.2 is shown in FIG. 3. For example, it may be necessary for an anesthesia workstation, comprising a software-controlled respirator 2.1 and a software-controlled infusion device 2.2, to transfer license information to one of the devices or to both devices. The processor unit 12 of the license detection device 6 controls for this purpose the process step of authentication with the device 2.1, 2.2 to which the license information is to be transferred. The at least one license information located on the memory unit 9 of T-SIM 3 contains for this a piece of information showing which of the devices 2.1 and 2.2 the license information is intended for. After authentication, the at least one license information for one or more license-requiring software components is transferred from the memory unit 9 of T-SIM 3 to and stored in the memory unit 10.1 or 10.2 of i-SIM 4.1 or 4.2 of the device 2.1 or 2.2, which is determined as the target by the assignment contained in the license information.

While specific embodiments of the invention have been shown and described in detail to illustrate the application of the principles of the invention, it will be understood that the invention may be embodied otherwise without departing from such principles.

APPENDIX

List of Reference Numbers

1 . . . Licensing system
2, 2.1, 2.2 . . . Software-controlled device
3 . . . First license data storage medium—T-SIM card
4, 4.1, 4.2 . . . Second license data storage medium—i-SIM card
5 . . . Data transfer channel
6 . . . License detection device
7, 7.1, 7.2 . . . License-providing device
8 . . . Processor unit of first license data storage medium
9 . . . Memory unit of first license data storage medium
10, 10.1, 10.2 . . . Processor unit of second license data storage medium
11, 11.1, 11.2 . . . Memory unit of second license data storage medium
12 . . . Processor unit of license detection device

What is claimed is:

1. A licensing system for transferring license information for license-requiring software component of software-controlled devices, the system comprising:
 a first portable license data storage medium provided with a processor unit and a memory unit, said license data storage medium having license information for the license-requiring software component stored in said memory unit,
 a second exchangeable license data storage medium provided with a processor unit and a memory unit;
 a data transfer channel for transferring data between said first license data storage medium and said second license data storage medium;
 a license detection device for polling said license information of said first license data storage medium and for transferring said license information to said second license data storage medium via said data transfer channel, wherein said license information can be stored in said memory unit of said second license data storage medium and cannot subsequently be polled any longer on said first license data storage medium, wherein said license information in said first portable license data storage medium is one of blocked and deleted upon said license information being stored in said memory unit of said second license data storage medium; and
 a license-providing device, said license-providing device one of making available and transferring said license information stored in said memory unit of said second license data storage medium to the software-controlled device for one of releasing and blocking at least one license-requiring software component.

2. A licensing system in accordance with claim 1, wherein said data transfer channel comprises a coded connection.

3. A licensing system in accordance with claim 2, wherein said data transfer channel comprises a 128-bit SSL-coded connection.

4. A licensing system in accordance with claim 1, wherein the data transfer of said data transfer channel takes place in a contactless manner.

5. A licensing system in accordance with claim 1, wherein said license detection device has a processor unit.

6. A licensing system in accordance with claim 1, wherein said first license data storage medium comprises a SIM card.

7. A licensing system in accordance with claim 1, wherein said second license data storage medium comprises a SIM card.

8. A licensing system in accordance with claim 1, wherein at least one of the software-controlled devices is one of an anesthesia apparatus and a respirator, said second exchangeable license data storage medium and said license-providing device being arranged as part of said one of said anesthesia apparatus and said respirator, said first portable license data storage medium not being part of said one of said anesthesia apparatus and said respirator.

9. A licensing system in accordance with claim 8, wherein said license information stored in said second exchangeable license data storage medium of said at least one of the software-controlled devices is transmitted to another one of the software-controlled devices with said at least one of the software-controlled devices in a damaged state, said another one of the software-controlled devices being one of an anesthesia apparatus and a respirator, said at least one of the software-controlled devices being of a same type as said another one of the software-controlled devices.

10. A process for using a licensing system, the process comprising:
   providing a license-requiring software component of a software-controlled medical device;
   storing license information for the license-requiring software component in a memory unit of a first portable license data storage medium provided with a processor unit and the memory unit;
   providing a second exchangeable license data storage medium with a processor unit and a memory unit, said second exchangeable license data storage medium being part of said software-controlled medical device;
   providing a data transfer channel;
   polling the license information of the first license data storage medium with a license detection device;
   transferring the license information of the first license data storage medium to the second license data storage medium via the data transfer channel and allowing the license information to be stored in the memory unit of the second license data storage medium and preventing the license information from subsequently being polled on the first license data storage medium, wherein said license information cannot be transmitted to said first exchangeable license data storage medium after said license information is stored in the memory unit of said second exchangeable license data storage medium; and
   one of making available and transferring the license information stored in the memory unit of the second license data storage medium to the software-controlled device for one of releasing and blocking the license-requiring software component.

11. A process in accordance with claim 10, wherein said software-controlled medical device is one of an anesthesia apparatus and a respirator, said second exchangeable license data storage medium being arranged as part of said one of said anesthesia apparatus and said respirator, said first portable license data storage medium not being part of said one of said anesthesia apparatus and said respirator.

12. A process in accordance with claim 11, further comprising another software-controlled medical device, wherein said license information is transferred from said software-controlled medical device to said another software-controlled medical device when said software-controlled medical device is in a damaged state, said another software-controlled medical device being of a same type as said software-controlled medical device, said another software-controlled medical device being one of an anesthesia apparatus and a respirator.

13. A process for transferring license information for a license-requiring software component of software-controlled devices, the process comprising the steps of:
   authenticating a first license data storage medium against a second license data storage medium and vice versa;
   establishing a coded connection between the first license data storage medium and the second license data storage medium;
   transferring license information from the first license data storage medium to the second license data storage medium using the coded connection;
   not making available the license information on the first license data storage medium after transferring said license information from said first license data storage medium to said second license data storage medium; and
   adding the license information on the second license data storage medium.

14. A process in accordance with claim 13, wherein the license information provides one of a release and blocking of at least one license-requiring software component of the software-controlled device.

15. A process in accordance with claim 14, wherein the license information contains data on the model of the software-controlled device.

16. A process in accordance with claim 14, wherein the license information of the second license data storage medium is one of made available and transferred to the license-requiring software component.

17. A process in accordance with claim 13, wherein the authentication of the first license data storage medium against the second license data storage medium and vice versa is performed step by a processor unit of the first license data storage medium and a processor unit of the second license data storage medium.

18. A process in accordance with claim 13, wherein authentication of the first license data storage medium against the second license data storage medium and vice versa includes using a processor unit of a license detection device with a processor unit of the first license data storage medium and a processor unit of the second license data storage medium.

19. A process in accordance with claim 13, wherein said one of the software-controlled devices being one of an anesthesia apparatus and a respirator, said second license data storage medium being part of said one of said anesthesia apparatus and said respirator, wherein said first license data storage medium is not part of said one of said anesthesia apparatus and said respirator, said first license data storage medium being provided with a processor unit and a memory unit.

20. A process in accordance with claim 19, wherein said license information stored in said second license data storage medium in the one of the software-controlled devices is transmitted to another one of the software-controlled devices, said another one of the software-controlled devices is of a same type as said one of the software-controlled devices, said another one of the software-controlled devices is one of an anesthesia apparatus and a respirator.

* * * * *